J. FINN.
POULTRY NEST.
APPLICATION FILED MAY 27, 1912.
1,070,255.
Patented Aug. 12, 1913.
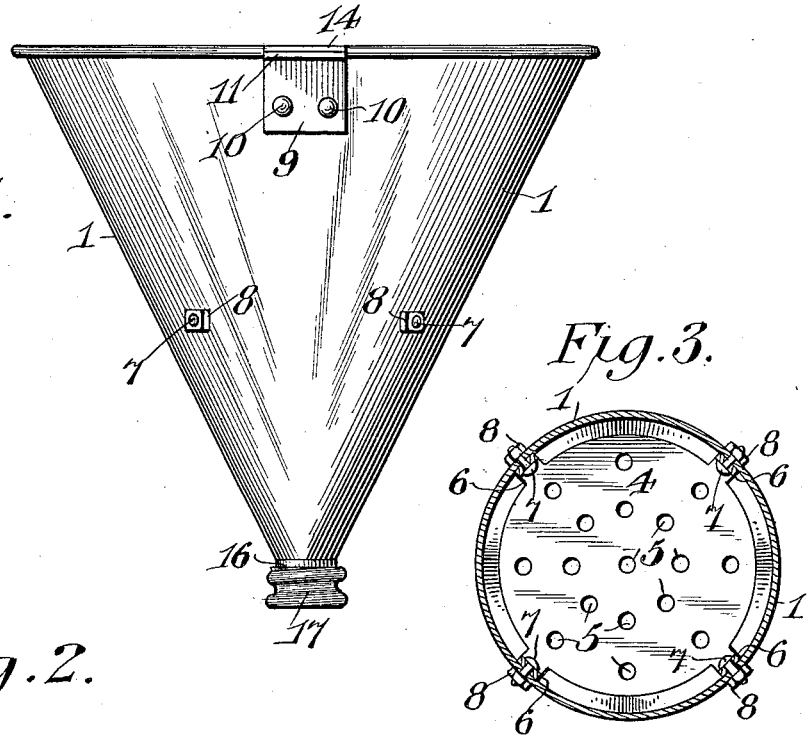
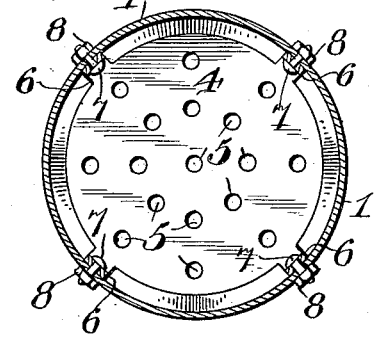
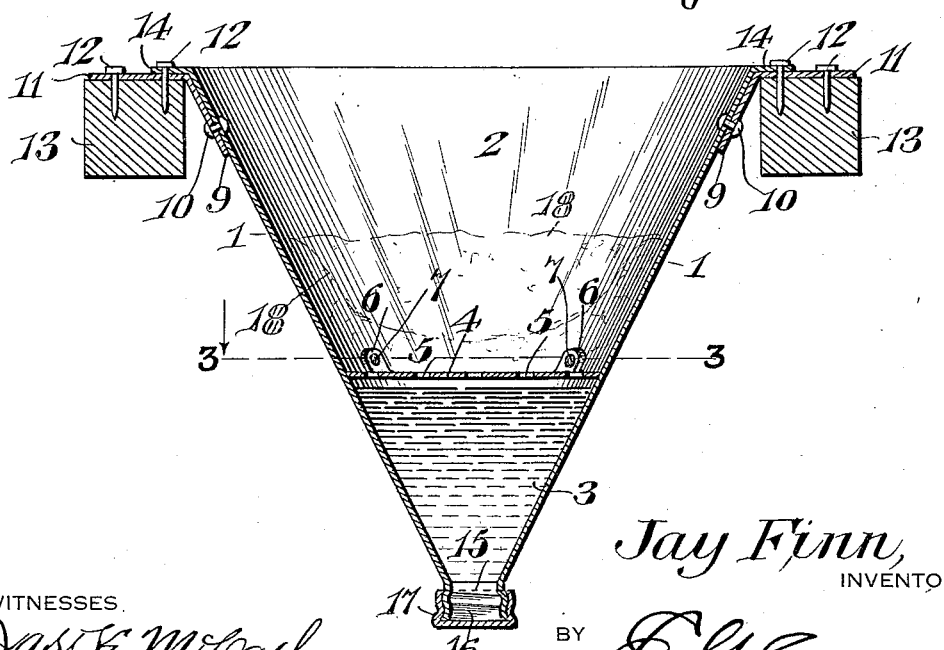
Jay Finn, INVENTOR

UNITED STATES PATENT OFFICE.

JAY FINN, OF ELMO, KANSAS.

POULTRY-NEST.

1,070,255.   Specification of Letters Patent.   Patented Aug. 12, 1913.

Application filed May 27, 1912. Serial No. 699,953.

*To all whom it may concern:*

Be it known that I, JAY FINN, a citizen of the United States, residing at Elmo, in the county of Dickinson and State of Kansas, have invented a new and useful Poultry-Nest, of which the following is a specification.

The invention relates to improvements in poultry nests.

The object of the present invention is to improve the construction of poultry nests, and to provide a simple, sanitary and practical poultry nest of inexpensive construction, equipped with means for containing a quantity of liquid or other insecticide adapted for destroying chicken lice and other vermin.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a side elevation of a poultry nest, constructed in accordance with this invention. Fig. 2 is a central vertical sectional view. Fig. 3 is a horizontal sectional view on the line 3—3 of Fig. 2.

Like numerals of reference designate corresponding parts in all the figures of the drawing.

In the accompanying drawing in which is illustrated the preferred embodiment of the invention, the poultry nest comprises in its construction a substantially conical or funnel-shaped receptacle 1, constructed of sheet metal or any other suitable material, and divided into an upper nest compartment 2 and a lower insecticide compartment 3 by a horizontal partition 4, constituting the bottom of the nest compartment and provided with perforations 5, arranged at intervals and adapted to permit the fumes of a liquid insecticide, insect powder, or the like to pass upwardly through the bottom of the nest compartment for destroying chicken lice and other vermin. The horizontal partition, which fits against the inclined faces of the sides of the conical receptacle, is provided with integral ears 6 having perforations for the reception of bolts 7, which pierce the sides or walls of the conical receptacle. The bolts 7 are provided at their inner ends with heads and are equipped at their outer ends with nuts 8, and they permit the horizontal partition to be readily removed when desired. Although it is most desirable to construct the poultry nest of a single receptacle, yet the same result may be obtained by employing separate receptacles for the upper and lower compartments.

The conical receptacle is equipped at its upper portion at diametrically opposite points with attaching plates 9, secured by rivets 10, or other suitable fastening devices to the conical receptacle and angularly bent to form outwardly extending horizontal portions 11, which are secured by inner and outer nails 12, or other suitable fastening devices to supporting bars or members 13. The conical receptacle is preferably provided at its upper edge adjacent to the attaching plates with horizontal flanges 14, extending outwardly at the horizontal portions of the said plates and fitting against the upper faces thereof and pierced by the inner fastening devices 12. The supporting bars or members are spaced apart to receive the poultry nest, but the latter may be supported by any other suitable means.

The conical receptacle is provided at its bottom or apex with an outlet opening 15, and it has a threaded flange 16 surrounding the same and receiving a screw cap 17, which normally closes the bottom outlet. The cap, however, may be readily removed for draining or drawing off the contents of the lower insecticide receptacle. The liquid insecticide will be readily poured into the lower compartment through the perforations of the horizontal partition 4, and when a hen is on the nest, the heat of its body will assist in the vaporization of the liquid and the fumes thereof will pass through the perforations of the partition and through straw or other material 18 and thoroughly permeate the feathers of the hen, or other fowl and destroy the chicken lice or other vermin. The straw 18 or other material illustrated in dotted lines in Fig. 2 of the drawing is arranged upon and supported by the horizontal partition.

What is claimed is:—

A poultry nest comprising a substantially inverted conical or funnel-shaped receptacle open at the top and having an outlet at the bottom, a horizontal partition arranged within the said receptacle and dividing the same into an upper nest compartment and a lower insecticide compartment, said partition constituting the bottom of the nest compartment and provided with openings to permit fumes from the insecticide compartment to pass upwardly into the nest compartment to destroy chicken lice and other vermin, and a removable closure for the said outlet.

In testimony that I claim the foregoing as my own, I have hereto affixed my signature in the presence of two witnesses.

JAY FINN.

Witnesses:
 WILLIAM FINN,
 CHRISTIAN RHODES.